(12) United States Patent
Cowings et al.

(10) Patent No.: US 8,145,710 B2
(45) Date of Patent: Mar. 27, 2012

(54) SYSTEM AND METHOD FOR FILTERING SPAM MESSAGES UTILIZING URL FILTERING MODULE

(75) Inventors: David Cowings, El Cerrito, CA (US); David Hoogstrate, San Francisco, CA (US); Sandy Jensen, Berkeley, CA (US); Art Medlar, Berkeley, CA (US); Ken Schneider, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 1940 days.

(21) Appl. No.: 10/871,583

(22) Filed: Jun. 17, 2004
(Under 37 CFR 1.47)

(65) Prior Publication Data
US 2009/0070872 A1    Mar. 12, 2009

Related U.S. Application Data

(60) Provisional application No. 60/479,754, filed on Jun. 18, 2003.

(51) Int. Cl.
*G06F 15/16*    (2006.01)
(52) U.S. Cl. ........................ 709/205; 709/206
(58) Field of Classification Search .......... 709/205, 709/206
See application file for complete search history.

(56) References Cited

U.S. PATENT DOCUMENTS

| | | | |
|---|---|---|---|
| 5,121,345 A | 6/1992 | Lentz | |
| 5,377,354 A | 12/1994 | Scannell et al. | |
| 5,438,433 A | 8/1995 | Reifman et al. | |
| 5,440,723 A | 8/1995 | Arnold et al. | |
| 5,537,540 A | 7/1996 | Miller et al. | |
| 5,557,789 A | 9/1996 | Mase et al. | |
| 5,619,648 A | 4/1997 | Canale et al. | |
| 5,634,005 A | 5/1997 | Matsuo | |
| 5,649,182 A | 7/1997 | Reitz | |
| 5,675,507 A | 10/1997 | Bobo, II | |
| 5,678,041 A | 10/1997 | Baker et al. | |
| 5,696,898 A | 12/1997 | Baker et al. | |
| 5,790,789 A | 8/1998 | Suarez | |
| 5,796,948 A | 8/1998 | Cohen | |
| 5,802,277 A | 9/1998 | Cowlard | |

(Continued)

FOREIGN PATENT DOCUMENTS

EP    0375138    6/1990

(Continued)

OTHER PUBLICATIONS

Berners-Lee, T., et al., "Uniform Resource Identifiers (URI): Generic Syntax," Network Working Group, Request for Comments: 2396, Online Aug. 1998, pp. 1-40.

(Continued)

*Primary Examiner* — Adnan Mirza
(74) *Attorney, Agent, or Firm* — Meyertons, Hood, Kivlin, Kowert & Goetzel, P.C.; Dean M. Munyon (57) ABSTRACT

Systems and methods for filtering spam messages utilizing a URL filtering module are described. In one embodiment, the method includes detecting, in an incoming message, data indicative of a URL and comparing the URL from the incoming message with URLs characterizing spam. The method further includes determining whether the incoming message is spam based on the comparison of the URL from the incoming message with the URLs characterizing spam.

16 Claims, 10 Drawing Sheets

U.S. PATENT DOCUMENTS

| | | | |
|---|---|---|---|
| 5,809,242 A | 9/1998 | Shaw et al. | |
| 5,822,527 A | 10/1998 | Post | |
| 5,826,022 A | 10/1998 | Nielsen | |
| 5,835,087 A | 11/1998 | Herz et al. | |
| 5,845,263 A | 12/1998 | Camaisa et al. | |
| 5,862,325 A | 1/1999 | Reed et al. | |
| 5,864,684 A | 1/1999 | Neilsen | |
| 5,870,546 A | 2/1999 | Kirsch | |
| 5,870,548 A | 2/1999 | Neilsen | |
| 5,874,955 A | 2/1999 | Rogowitz et al. | |
| 5,884,033 A | 3/1999 | Duvall et al. | |
| 5,889,943 A | 3/1999 | Ji et al. | |
| 5,905,863 A | 5/1999 | Knowles et al. | |
| 5,919,257 A | 7/1999 | Trostle | |
| 5,930,479 A | 7/1999 | Hall | |
| 5,956,481 A | 9/1999 | Walsh et al. | |
| 5,968,117 A | 10/1999 | Schuetze | |
| 5,978,837 A | 11/1999 | Foladare et al. | |
| 5,999,932 A | 12/1999 | Paul | |
| 5,999,967 A | 12/1999 | Sundsted | |
| 6,023,700 A | 2/2000 | Owens et al. | |
| 6,023,723 A | 2/2000 | McCormick et al. | |
| 6,052,709 A | 4/2000 | Paul | |
| 6,073,165 A | 6/2000 | Narasimhan et al. | |
| 6,088,804 A | 7/2000 | Hill et al. | |
| 6,112,227 A | 8/2000 | Heiner | |
| 6,146,026 A | 11/2000 | Ushiku | |
| 6,149,318 A | 11/2000 | Chase et al. | |
| 6,157,630 A | 12/2000 | Adler et al. | |
| 6,158,031 A | 12/2000 | Mack et al. | |
| 6,158,045 A | 12/2000 | You | |
| 6,161,130 A | 12/2000 | Horvitz et al. | |
| 6,173,364 B1 | 1/2001 | Zenchelsky et al. | |
| 6,182,118 B1 | 1/2001 | Finney et al. | |
| 6,182,227 B1 | 1/2001 | Blair et al. | |
| 6,189,026 B1 | 2/2001 | Birrell et al. | |
| 6,195,686 B1 | 2/2001 | Moon et al. | |
| 6,199,102 B1 | 3/2001 | Cobb | |
| 6,216,165 B1 | 4/2001 | Woltz et al. | |
| 6,226,630 B1 | 5/2001 | Billmers | |
| 6,230,156 B1 | 5/2001 | Hussey | |
| 6,266,774 B1 | 7/2001 | Sampath et al. | |
| 6,272,641 B1 | 8/2001 | Ji | |
| 6,314,454 B1 | 11/2001 | Wang et al. | |
| 6,327,610 B2 | 12/2001 | Uchida et al. | |
| 6,330,588 B1 | 12/2001 | Freeman | |
| 6,334,140 B1 | 12/2001 | Kawamata | |
| 6,360,254 B1 | 3/2002 | Linden et al. | |
| 6,377,949 B1 | 4/2002 | Gilmour | |
| 6,393,465 B2* | 5/2002 | Leeds | 709/207 |
| 6,393,568 B1 | 5/2002 | Ranger et al. | |
| 6,411,947 B1 | 6/2002 | Rice et al. | |
| 6,421,709 B1 | 7/2002 | McCormick et al. | |
| 6,438,125 B1 | 8/2002 | Brothers | |
| 6,438,608 B2 | 8/2002 | Biliris et al. | |
| 6,449,634 B1 | 9/2002 | Capiel | |
| 6,460,075 B2 | 10/2002 | Krueger et al. | |
| 6,466,966 B1 | 10/2002 | Kirsch et al. | |
| 6,505,237 B2 | 1/2003 | Beyda et al. | |
| 6,523,120 B1 | 2/2003 | Strasnick | |
| 6,546,416 B1 | 4/2003 | Kirsch | |
| 6,549,957 B1 | 4/2003 | Hanson et al. | |
| 6,571,275 B1 | 5/2003 | Dong et al. | |
| 6,615,242 B1 | 9/2003 | Riemers | |
| 6,654,787 B1 | 11/2003 | Aronson et al. | |
| 6,671,812 B1 | 12/2003 | Balasubramaniam et al. | |
| 6,691,156 B1* | 2/2004 | Drummond et al. | 709/206 |
| 6,718,321 B2 | 4/2004 | Birrell et al. | |
| 6,732,157 B1 | 5/2004 | Gordon et al. | |
| 6,748,422 B2* | 6/2004 | Morin et al. | 709/206 |
| 6,757,713 B1 | 6/2004 | Ogilvie et al. | |
| 6,785,732 B1 | 8/2004 | Bates et al. | |
| 6,792,543 B2 | 9/2004 | Pak et al. | |
| 6,836,272 B2 | 12/2004 | Leung et al. | |
| 6,859,833 B2 | 2/2005 | Kirsch et al. | |
| 7,010,698 B2 | 3/2006 | Sheymov | |
| 7,072,944 B2 | 7/2006 | Lalonde et al. | |
| 7,092,992 B1 | 8/2006 | Yu | |
| 7,093,121 B2 | 8/2006 | Barton et al. | |
| 7,096,500 B2 | 8/2006 | Roberts et al. | |
| 7,114,177 B2 | 9/2006 | Rosenberg et al. | |
| 7,272,853 B2* | 9/2007 | Goodman et al. | 726/13 |
| 7,315,893 B2 | 1/2008 | Vinberg | |
| 7,331,062 B2 | 2/2008 | Alagna et al. | |
| 7,395,657 B2 | 7/2008 | Johnson | |
| 7,451,487 B2 | 11/2008 | Oliver et al. | |
| 7,620,690 B1 | 11/2009 | Castelli | |
| 2001/0042240 A1 | 11/2001 | Ng et al. | |
| 2002/0007301 A1 | 1/2002 | Reuning | |
| 2002/0046065 A1 | 4/2002 | Nighan | |
| 2002/0116463 A1* | 8/2002 | Hart | 709/206 |
| 2002/0116635 A1 | 8/2002 | Sheymov | |
| 2002/0120705 A1* | 8/2002 | Schiavone et al. | 709/207 |
| 2002/0147780 A1 | 10/2002 | Liu et al. | |
| 2002/0150243 A1 | 10/2002 | Craft et al. | |
| 2002/0174137 A1 | 11/2002 | Wolff et al. | |
| 2002/0198950 A1 | 12/2002 | Leeds | |
| 2002/0199095 A1 | 12/2002 | Bandini et al. | |
| 2002/0199120 A1 | 12/2002 | Schmidt | |
| 2003/0023722 A1 | 1/2003 | Vinberg | |
| 2003/0033536 A1 | 2/2003 | Pak et al. | |
| 2003/0097451 A1 | 5/2003 | Bjorksten et al. | |
| 2003/0159070 A1 | 8/2003 | Mayer et al. | |
| 2003/0174137 A1 | 9/2003 | Leung et al. | |
| 2004/0054917 A1 | 3/2004 | Obrecht et al. | |
| 2004/0064736 A1 | 4/2004 | Obrecht et al. | |
| 2004/0073617 A1 | 4/2004 | Milliken et al. | |
| 2004/0078422 A1* | 4/2004 | Toomey | 709/202 |
| 2004/0088570 A1 | 5/2004 | Roberts et al. | |
| 2004/0098607 A1 | 5/2004 | Alagna et al. | |
| 2004/0122976 A1 | 6/2004 | Dutta et al. | |
| 2004/0123157 A1 | 6/2004 | Alagna et al. | |
| 2004/0167968 A1 | 8/2004 | Wilson et al. | |
| 2004/0177120 A1 | 9/2004 | Kirsch et al. | |
| 2004/0187023 A1 | 9/2004 | Alagna et al. | |
| 2004/0230820 A1 | 11/2004 | Hui Hsu et al. | |
| 2005/0015454 A1 | 1/2005 | Goodman et al. | |
| 2005/0015626 A1 | 1/2005 | Chasin | |
| 2005/0041789 A1 | 2/2005 | Warren-Smith et al. | |
| 2005/0050222 A1 | 3/2005 | Packer | |
| 2005/0060643 A1 | 3/2005 | Glass et al. | |
| 2005/0081059 A1 | 4/2005 | Bandini et al. | |
| 2005/0108339 A1 | 5/2005 | Gleeson et al. | |
| 2005/0108340 A1 | 5/2005 | Gleeson et al. | |
| 2005/0108639 A1 | 5/2005 | Fields et al. | |
| 2005/0137980 A1 | 6/2005 | Bullock et al. | |
| 2006/0031298 A1 | 2/2006 | Hasegawa | |
| 2006/0053490 A1 | 3/2006 | Herz et al. | |
| 2006/0168006 A1 | 7/2006 | Shannon et al. | |
| 2006/0251068 A1 | 11/2006 | Judge et al. | |
| 2006/0253597 A1 | 11/2006 | Mujica | |
| 2006/0265498 A1 | 11/2006 | Turgeman et al. | |
| 2006/0288076 A1 | 12/2006 | Cowings et al. | |
| 2007/0143432 A1 | 6/2007 | Klos et al. | |
| 2007/0294352 A1 | 12/2007 | Shraim et al. | |
| 2009/0070872 A1 | 3/2009 | Cowings et al. | |

FOREIGN PATENT DOCUMENTS

| | | |
|---|---|---|
| EP | 0420779 | 4/1991 |
| EP | 0720333 | 7/1996 |
| GB | 2271002 | 3/1994 |
| JP | 10240649 | 11/1998 |
| JP | 2003 263391 | 9/2003 |
| TW | 507140 | 10/2002 |
| TW | 517191 | 1/2003 |
| WO | 9635994 | 11/1996 |
| WO | 9837680 | 8/1998 |
| WO | 0203178 | 1/2002 |
| WO | 02103533 | 12/2002 |
| WO | 2004021197 | 3/2004 |
| WO | 2004055632 | 7/2004 |
| WO | 2004072777 | 8/2004 |

OTHER PUBLICATIONS

Cournane, A., et al., "An Analysis of the Tools Used for the Generate and Prevention of Spam," Computers & Security, Elsevier Science Publishers, vol. 23, No. 2, Mar. 2004, pp. 154-166.

PCT Search Report PCT/US2004/019791 dated Nov. 2, 2004, 6 pages.

Spamassassin, SpamAssassin Reference: uri SYMBOLIC_TEST_NAME/pattern/modifiers, Version 2.6x, 1 page, Available: http://spamassassin.apache.org/tmp/ref/2.6x/uri.html, downloaded Jul. 15, 2005.

Clark et al., "PCMAIL: A Distributed Mail System for Personal Computers," May 1986, MIT Laboratory for Computer Science, 28 Pages (1-28).

U.S. Appl. No. 10/117,065, entitled "Apparatus and Method for Weighted and Aging Spam Filtering Rules," by Sunil Paul, et al., filed Apr. 4, 2002.

U.S. Appl. No. 10/949,465, entitled "System and Method for Filtering Fraudulent Email Messages," by Bruno, et al., filed Sep. 24, 2004.

U.S. Appl. No. 11/048,958, entitled "Method and Apparatus for Determining the Source of an Email Message," by Mantel, filed Feb. 1, 2005.

U.S. Appl. No. 11/157,327, entitled "Method and Apparatus for Grouping Spam Email Messages," by Jensen, filed Jun. 20, 2005.

U.S. Appl. No. 11/127,813, entitled "Method and Apparatus for Simulating End User Responses to Spam Email Messages," by Khalsa, et al., filed May 11, 2005.

U.S. Appl. No. 11/116,572, entitled "Method and Apparatus for Creating Aggressive Anti-Spam Rules," by Chin, et al., filed Apr. 27, 2005.

Harker, R., "Selectively Rejecting Spam Using Sendmail," Proceedings of the Eleventh Systems Administration Conference, abstract only, Oct. 1997.

Gaskin, J.E., "Don't Get Spammed," Information Week, Aug. 18, 1997, retrieved from Internet: http://www.informationweek.com/644/44olspm.htm, 9 pages.

Ranum, M.J. et al., "Implementing a Generalized Tool for Network Monitoring," Proceedings of the Eleventh Systems Administration Conference (LISA XI), San Diego, CA, Oct. 26-31, 1997, pp. 1-8.

Kaufman, et al., "Network Security: Private Communication in a Public World—Revocation—Section 15.4," 2nd Edition, Prentice Hall Series in Computer Networking and Distributed Systems, 2002, 4 pages.

Translation of Office Action in Taiwanese Application No. 093117715 dated Aug. 11, 2010.

Berners-Lee, et al. "Uniform Resource Identifieers (URI): Generic Syntax" Standards Track RFC 2396 URI Generic Syntax; Aug. 1998. http://www.ietf.org/rfc/rfc2396.txt.

* cited by examiner

SYSTEM AND METHOD FOR FILTERING SPAM MESSAGES UTILIZING URL FILTERING MODULE

RELATED APPLICATION

The present application claims priority to U.S. Provisional Application Ser. No. 60/479,754, filed Jun. 18, 2003, which is incorporated herein in its entirety.

FIELD OF THE INVENTION

The present invention relates to data processing, and in particular, to filtering email spam using a URL filtering module.

BACKGROUND OF THE INVENTION

The Internet is growing in popularity, and more and more people are conducting business over the Internet, advertising their products and services by generating and sending electronic mass mailings. These electronic messages (emails) are usually unsolicited and regarded as nuisances by the recipients because they occupy much of the storage space needed for necessary and important data processing. For example, a mail server may have to reject accepting an important and/or desired email when its storage capacity is filled to the maximum with unwanted emails containing advertisements. Moreover, thin client systems such as set top boxes, PDA's, network computers, and pagers all have limited storage capacity. Unwanted emails in any one of such systems can tie up a finite resource for the user. In addition, a typical user wastes time by downloading voluminous but useless advertisement information. These unwanted emails are commonly referred to as spam.

Presently, there are products that are capable of filtering out unwanted messages. For example, a spam block method exists which keeps an index list of all spam agents (i.e., companies that generate mass unsolicited emails), and provides means to block any email sent from a company on the list.

Another "junk mail" filter currently available employs filters which are based on predefined words and patterns as mentioned above. An incoming mail is designated as an unwanted mail if the subject contains a known spam pattern.

However, as spam filtering grows in sophistication, so do the techniques of spammers in avoiding the filters. Examples of tactics incorporated by a recent generation of spammers include randomization, origin concealment, and filter evasion using HTML.

Another tactic spammers use to avoid filters is soliciting recipients to perform additional actions beyond reading the incoming email. An example of one such method is providing a Uniform Resource Locator (URL) in the body of the email that points to a Web site.

Spammers often disguise the URL to make the URL look legitimate. The disguised URLs, purporting to originate from legitimate organizations, may then be used to entice recipients to provide private and financial information.

SUMMARY OF THE INVENTION

Systems and methods for filtering spam messages utilizing a URL filtering module are described herein. In one embodiment, the method includes detecting, in an incoming message, data indicative of a URL and comparing the URL from the incoming message with URLs characterizing spam. The method further includes determining whether the incoming message is spam based on the comparison of the URL from the incoming message with the URLs characterizing spam.

Other features of the present invention will be apparent from the accompanying drawings and from the detailed description that follows.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PREFERRED EMBODIMENTS

A method and system for filtering email spam based on URLs present in email messages are described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

URLs

A Uniform Resource Locator (URL) is a standardized address for some resource (such as a document or image) on the Internet. According to Internet standards defined by the Internet Engineering Task Force (IETF), a URL has the following format: <scheme>: <scheme-specific-part>. A common syntax for the scheme-specific part is: //<user>:<password>@<host>:<port><url-path>. One exemplary scheme is HyperText Transfer Protocol (HTTP). An HTTP URL has the following format: http://<host>:<port>/<path>?<searchprt>. The host may be a hostname (e.g., http://www.brightmail.com) or a hostnumber (e.g., http://209.157.160.6). The hostnumber is also referred to as an IP address. URLs may also point to a secure web site using the secure version of HTTP known as HTTPS.

URLs may include sub-domains and redirections to target URLs. The inclusion of different sub-domains into a URL may allow spammers to create unique URLs pointing to the same target URL. For example, a spammer may point to the same spam URL "http://hgh.com" from the URLs "http://abunchoftext.hgh.com" and "http://abunchofbananas.hch.com" that include different sub-domains. Similarly, the inclusion of the same redirect URL into two different URLs may allow spammers to create unique URLs pointing to the same target URL. For example, the URL "http://rd.yahoo.com/structure/226/3696/454/*http://www.pillsdirect.net" points to the target URL "http://www.pillsdirect.net".

Filtering Email Spam Based on a URL

Figure 1:
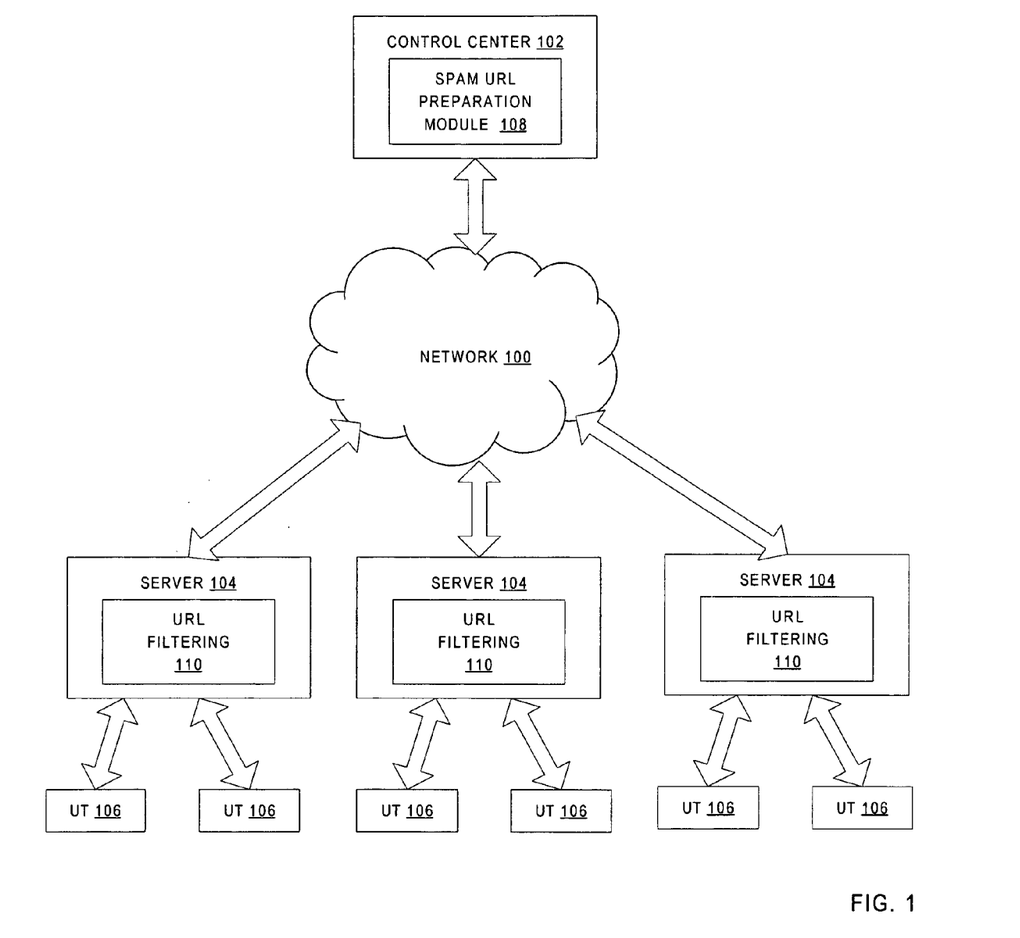
FIG. 1 is a block diagram of one embodiment of a system for controlling delivery of spam email based on URLs present in email.

FIG. 1 is a block diagram of one embodiment of a system for controlling delivery of spam electronic mail (email) based on URLs present in email. The system includes a control center 102 coupled to a communications network 100 such as a public network (e.g., the Internet, a wireless network, etc.) or a private network (e.g., LAN, Intranet, etc.). The control center 102 communicates with multiple network servers 104 via the network 100. Each server 104 communicates with user terminals 106 using a private or public network.

The control center 102 is an anti-spam facility that is responsible for analyzing messages identified as spam, developing filtering rules for detecting spam, and distributing the filtering rules to servers 104. A message may be identified as spam because it was sent by a known spam source (as determined, for example, using a "spam probe", i.e., an email address specifically selected to make its way into as many spammer mailing lists as possible).

A server 104 operates at a customer site and may be a mail server that receives and stores messages addressed to users of corresponding user terminals 106. Alternatively, a server 104 may be a different server coupled to the mail server 104. Servers 104 are responsible for filtering incoming messages based on the filtering rules received from the control center 102. Servers 104 operate as clients receiving services from the control center 102.

In one embodiment, the control center 102 includes a spam URL preparation module 108 that is responsible for generating URL data associated with a spam attack and sending this data to the servers 104. As will be discussed in more detail below, the URL data associated with a spam attack may include, for example, a hash value of the URL associated with a spam attack and/or a string of the URL associated with a spam attack.

Each server 104 includes a URL filtering module 110 that is responsible for storing spam URL data received from the control center 102 and identifying incoming email messages including URLs resembling any of the spam URLs.

In an alternative embodiment, each server 104 hosts both the spam URL preparation module 108 that generates spam URL data and the URL filtering module 110 that uses the spam URL data to determine whether incoming email messages are spam.

Figure 2:
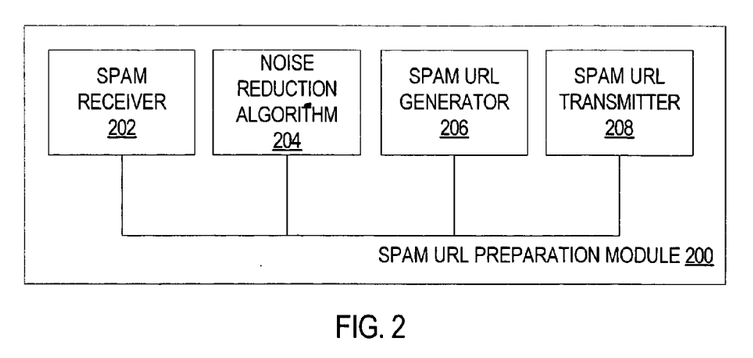
FIG. 2 is a block diagram of one embodiment of a spam URL preparation module.

FIG. 2 is a block diagram of one embodiment of a spam URL preparation module 200. The spam URL preparation module 200 includes a spam content parser 202, a spam URL generator 206, and a spam URL transmitter 208.

The spam content parser 202 is responsible for parsing the body of email messages resulting from spam attacks (referred to as spam messages) to identify data indicative of URLs. The incoming email message may be a plain text message, an HTML message, or a message of any other type.

In one embodiment, the spam URL preparation module 200 includes a noise reduction algorithm 204 that is responsible for removing noise from data indicative of URLs. As will be discussed in more detail below, noise represents unnecessary information, encoded information, and other extraneous information in the URL.

The spam URL generator 206 is responsible for generating URL rules that include URL data associated with a spam attack. In one embodiment, the spam URL generator 206 generates URL rules automatically. Alternatively, the spam URL generator 206 generates URL rules based on input provided by an operator of the control center 102.

In one embodiment, if a spam URL includes a path-level component, the spam generator 206 generates a URL rule including URL data for a host component of the URL (a host-level URL) and a path component of the URL (a path-level URL).

In one embodiment, if a spam URL includes one or more sub-domains, the spam generator 206 generates a URL rule including URL data for each sub-domain level. For example, for the URL "http://www.foo.test.com/spam-directory", the URL data may be created for sub-domains "foo.test.com", "foo.test.com/spam-directory" and "test.com". In one embodiment, the number for sub-domains in the URL data may not exceed a maximum allowed number of sub-domains.

In one embodiment, if a spam URL includes a redirection to a target URL, the spam generator 206 generates a URL rule including URL data for the entire URL and the target URL. For example, for the URL "http://rd.yahoo.com/structure/226/3696/454/*http://www.pillsdirect.net", the URL data is generated for the entire URL and the target URL "http://www.pillsdirect.net".

In one embodiment, the URL data includes a hash value of the URL associated with a spam attack. In another embodiment, the URL data includes a string of the URL associated with a spam attack. In yet another embodiment, the URL data includes both a hash value and a string of the URL associated with a spam attack In one embodiment, the URL generator 206 maintains a URL white-list that includes legitimate URLs that are not indicative of spam. In this embodiment, the URL generator 206 compares the URL extracted from a spam message with the URLs in the URL whitelist and refrains from including URLs matching URLs from the whitelist in the URL rules.

In one embodiment, the URL generator 206 associates each URL data with a relevant weight (e.g., as provided by an operator at the control center 102). The weight indicates the degree of spam indication for a specific URL. For example, for one URL, the presence of this URL alone is sufficient to classify an incoming email message as spam. For some other URLs, however, multiple URLs may need to be present in an incoming email message for this message to be classified as spam. In one embodiment, the URL generator 206 includes the weight in a relevant URL rule.

In one embodiment, a URL rule may include multiple URLs and/or their identifiers (e.g., hash values), as will be discussed in more detail below.

In one embodiment, the spam URL generator 206 also determines the type of web site associated with the URL (e.g., a product line of an associated web site) and includes a relevant web site type into each URL rule.

The spam URL transmitter 208 is responsible for distributing URL rules that include URL data associated with spam attacks to participating clients (e.g., modules operating at customer sites such as URL filtering modules 110 of FIG. 1). In one embodiment, the spam URL transmitter 208 distributes URL rules based on web site types requested by participating clients.

In one embodiment, each client periodically (e.g., each 5 minutes) initiates a connection (e.g., a secure HTTPS connection) with the call center 102. Using the pull-based connection, URL rules are transmitted from the call center 102 to the relevant client.

Figure 3:
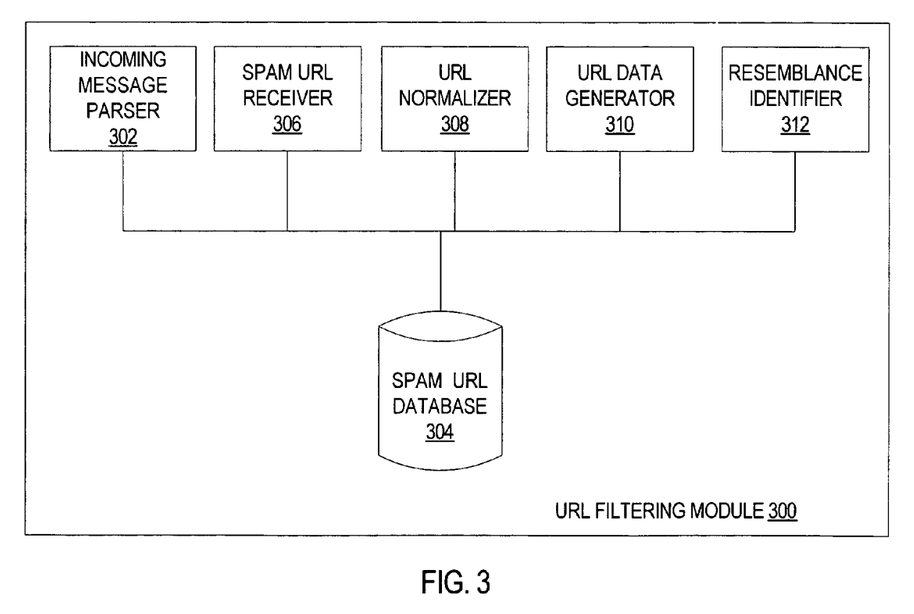
FIG. 3 is a block diagram of one embodiment of a URL filtering module.

FIG. 3 is a block diagram of a URL filtering module 300. The URL filtering module 300 includes an incoming message parser 302, a spam URL receiver 306, a URL data generator 310, a resemblance identifier 312, and a spam URL database 304.

The incoming message parser 302 is responsible for parsing the body of the incoming email messages for data indicative of URLs. The incoming email message may be a plain text message, an HTML message, or a message of any other type. In one embodiment, the URL filtering module 300 includes a URL normalizer 308 that is responsible for removing noise from the data indicative of a URL.

The spam URL receiver 306 is responsible for receiving URL rules including URL data associated with spam attacks and storing the URL rules in the spam URL database 304.

The URL data generator 310 is responsible for generating URL data for each URL extracted from an incoming email message. The URL data may include a hash value of the extracted URL and/or a string of the extracted URL. In one embodiment, the URL data generator 310 generates URL data both for a host component and path component of the URL, as will be discussed in more detail below in conjunction with FIG. 5.

The resemblance identifier 312 is responsible for comparing the URL data from the incoming email message with the spam URL data included in the URL rules stored in the spam database 304 and determining, based on this comparison, whether the incoming email message is spam. The determination may be based on exact matches (e.g., exact matches of hashes) or a certain degree of similarity (e.g., similarity between URL strings).

Figure 4:
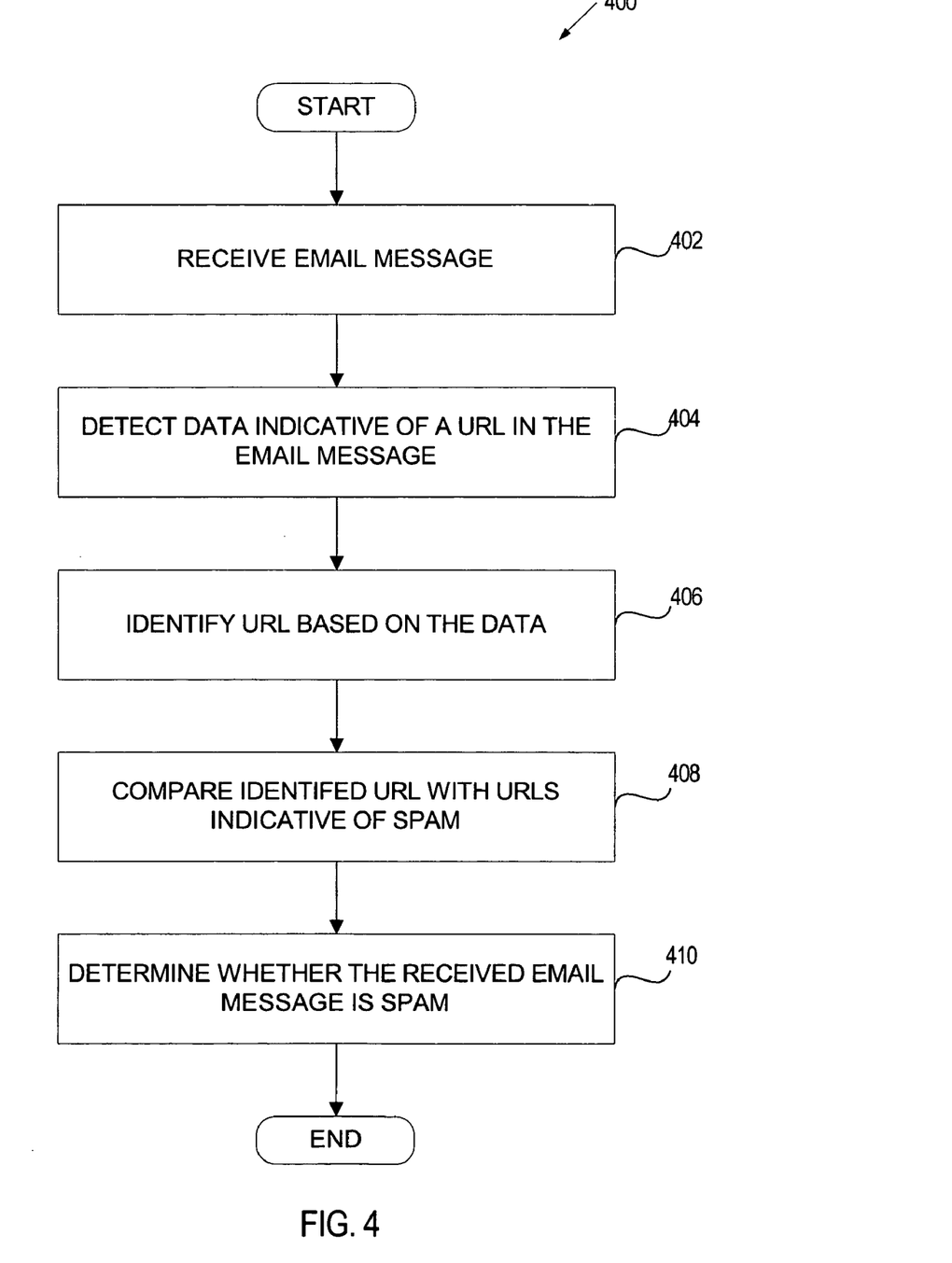
FIG. 4 is a flow diagram of one embodiment of a process for filtering email messages based on URLs.

FIG. 4 is a flow diagram of one embodiment of a process 400 for filtering email messages based on URLs. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a server 104 of FIG. 1.

Referring to FIG. 4, process 400 begins with processing logic receiving an email message (processing block 402). The email message may be an HTML formatted message, a plain text message, or a message of any other type.

At processing block 404, processing logic detects data indicative of a URL in the email message. The data indicative of a URL may be detected in the body of the email message or "mail-to" data in the email message. The data indicative of a URL includes a string similar to that of a URL. In one embodiment, the URL string may be detected in a markup language (e.g., HTML) message based on formatting data surrounding the URL string in the message. For example, in the HTML message, the URL string may be formatted as follows:

<a href="http://www.quickinspirations.com">.

The URL string may be detected even if formatting rules were not followed (e.g., the URL string is formatted incorrectly). For example, in HTML, the URL string may be formatted incorrectly as <a href-http://www.quickinspirations.com>.

At processing block 406, processing logic identifies a URL based on the data indicative of a URL (processing block 406). In some embodiments, processing logic identifies a URL by reducing noise in the data indicative of a URL (e.g., by eliminating extraneous information present in the data indicative of the URL). One embodiment of a method for reducing noise in data indicative of a URL will be described in greater detail below.

At processing block 408, processing logic compares the identified URL with spam URLs contained in the URL rules. The URLs may be compared using hashes, regular expressions (e.g., URL strings), or any other URL identifiers. Some embodiments of methods for comparing URLs will be described in more detail below.

At processing block 410, processing logic determines whether the received email message is spam. In one embodiment, this determination is based on an exact match between a URL from an incoming message and a spam URL from any URL rule.

In another embodiment, processing logic determines whether a resemblance between a URL from an incoming message and a spam URL from a URL rule exceeds a threshold.

In some embodiments, processing logic determines that an incoming message is spam if both the extracted URL and some other URL are present in the message. For example, the message may be classified as spam if a URL linking to a product being sold (e.g., http://eBaySecrtes.netbz.net/ebay/) is present in the message together with an opt-out link for a given direct mailer (e.g., http://www.netbz.net/). Alternatively, processing logic may determine that an incoming message is spam if the message includes an extracted URL but excludes some other URL. For example, the message may be classified as spam if a URL linking to a product being sold (e.g., http://eBaySecrtes.netbz.net/ebay/) is present in the message but a URL linking to a host web site (e.g., http://ebay.com/) is not present in the message.

In some embodiment, processing logic uses weights associated with spam URLs to determine whether an incoming message is spam, as will be described in more detail below with reference to FIG. 8.

Figure 5:
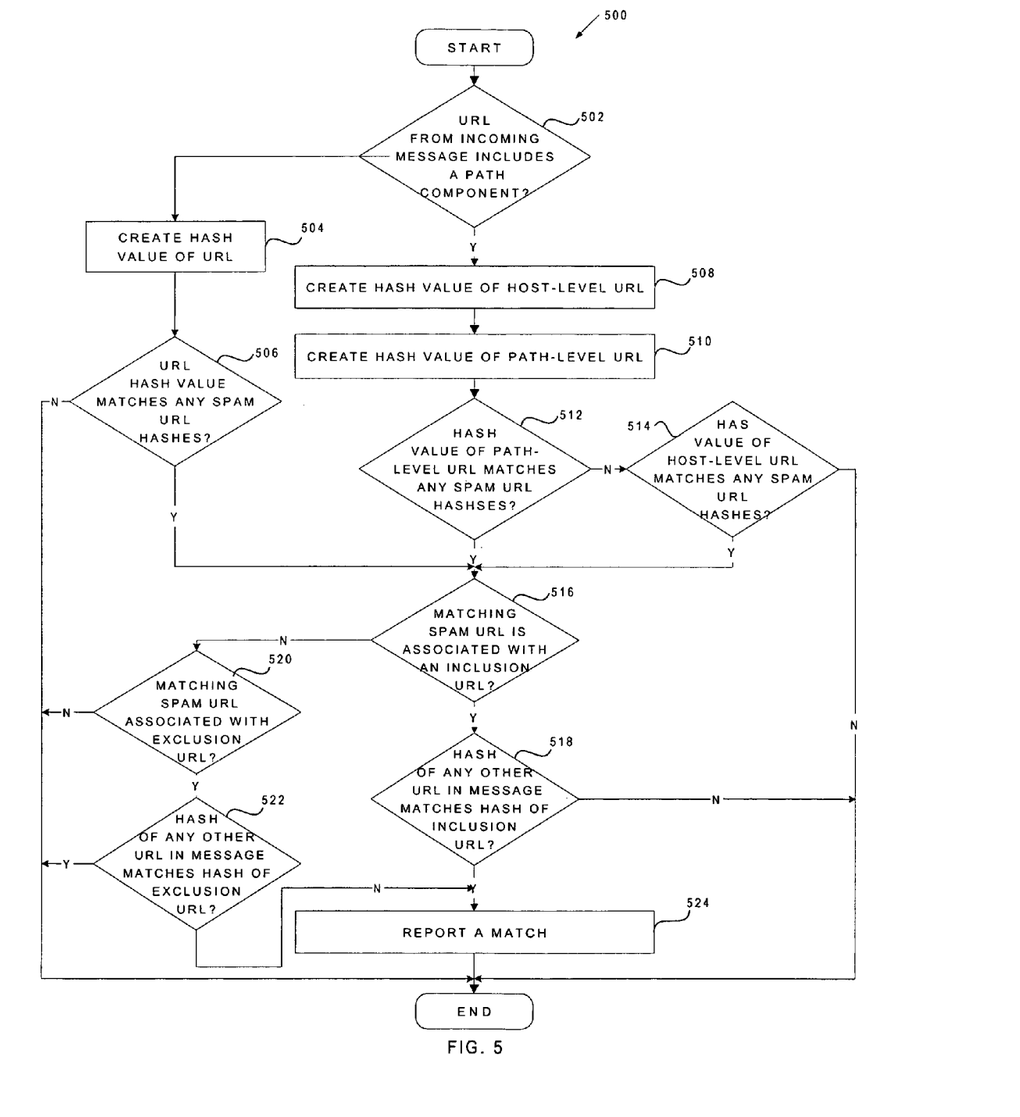
FIG. 5 is a flow diagram of one embodiment of a process for comparing host-level and path-level URLs from an incoming message with URLs indicative of spam.

As discussed above, a URL may include a host component and a path component identifying a single subdirectory. For some web sites, the use of a host-level URL may be enough to identify spam. However, for other web sites, a path-level URL may be needed. FIG. 5 is a flow diagram of one embodiment of a process 500 for comparing host-level and path-level URLs from an incoming message with URLs indicative of spam. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a server 104 of FIG. 1.

At processing block 502, processing logic determines whether a URL from an incoming email message includes a path component (processing block 502). If not, processing logic creates a hash value of the URL (processing block 504) and determines whether this hash value matches any spam URL hashes contained in URL rules stored in the database (processing block 506). If not, process 500 ends. If so, processing logic proceeds to processing block 516.

If the URL from the incoming email message includes a path component, processing logic creates a hash value for both a host-level URL (processing block 508) and a path-level URL (processing block 510). For example, for the URL "http://www.netbiz.net/some-directory", processing logic creates a hash value for the host-level URL "http://www.netbiz.net" and the path-level URL "http://www.netbiz.net/some-directory".

Next, processing logic determines whether the hash value of the path-level URL matches any spam URL hashes contained in the URL rules stored in the database (processing block 512). If so, processing logic proceeds to processing block 516. If not, processing logic determines whether the hash value of the host-level URL matches any spam URL hashes in the URL rules stored in the database (processing block 514). If the determination made at processing block 514 is negative, process 500 ends. If this determination is positive, processing logic proceeds to processing block 516.

At processing block 516, processing logic determines whether a URL rule containing the matching spam URL specifies an additional (inclusion) URL that also need to be present in the message for the message to be classified as spam. If processing logic determines that the URL rules species an inclusion URL, it further determines whether a hash of any other URL from the message matches a hash of the inclusion URL (processing block 518). If not, process 500 ends. If so, processing logic reports a match (processing block 524).

If processing logic determines that the URL rule does not specify an inclusion URL, it further determines whether the URL rule containing the matching spam URL specifies an exclusion URL (processing block 520). An exclusion URL is specified to indicate that the message will be classified as spam if the matching URL is present in the message but the exclusion URL is not present in the message.

If processing logic determines that the URL rule does not specify an exclusion URL, process 500 ends. If processing logic determines that the URL rule specifies an exclusion URL, it further determines whether a hash of any other URL from the message matches a hash of the exclusion URL (processing block 522). If so, process 500 ends. If not, processing logic reports a match (processing block 524).

It should be noted that although process 500 as described above uses URL hashes, it may instead use URL strings or any other URL identifiers without loss of generality. In some embodiments, in which process 500 uses URL strings, the URL strings are compared for similarity, rather than an exact match.

In one embodiment, process 500 may detect matches with multiple URL rules for a single email message. For example, the message "Hi there—check out http://eBaySecrets.netbz.net/ebay/ for a great deal or otherwise, if you've got plenty of money, go to http://www.netbz.net/some-directory" will match a URL rule specifying the URL "http://eBaySecrets.netbz.net" and a URL rule specifying a combination of two URLs "http://eBaySecrets.netbz.net/ebay/" and "http://www.netbz.net/".

Figure 6:
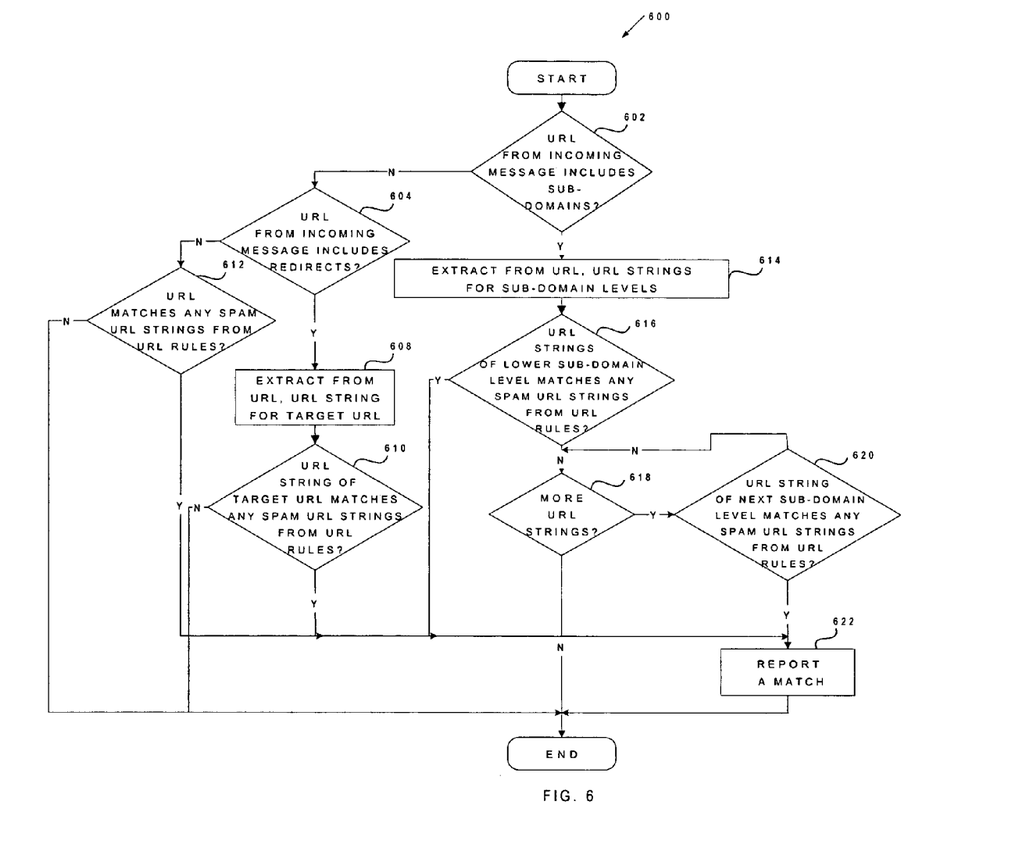
FIG. 6 is a flow diagram of one embodiment of a process for comparing URLs containing sub-domains or redirects with URLs indicative of spam.

FIG. 6 is a flow diagram of one embodiment of a process 600 for comparing URLs containing sub-domains or redirects with URLs indicative of spam. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a server 104 of FIG. 1.

At processing block 602, processing logic determines whether a URL from an incoming email message includes one or more sub-domains. If so, processing logic extracts, from the URL, a URL string for each sub-domain level (processing block 614). In one embodiment, the number for sub-domains in the extracted URL string may not exceed a maximum number of sub-domains. For example, if the maximum number of sub-domains is 4, the following URL strings may be extracted from the URL "http://www.abc.xyz.foo.test.com/spam-directory": "test.com", "foo.test.com", and "xyz.foo.test.com".

At processing block 616, processing logic determines whether a URL string associated with the smallest sub-domain level (e.g., "test.com" in the previous example) matches any spam URL string from URL rules stored in the database. If so, processing logic reports a match (processing block 622). If not, processing logic determines whether there are any extracted URL strings of higher sub-domain levels. If there are no more extracted URL strings, method 600 ends. If there is an extracted URL string of a higher sub-domain level, processing logic determines whether a URL string associated with the higher sub-domain level (e.g., "foo.test.com" in the previous example) matches any spam URL string from URL rules stored in the database. If so, processing logic reports a match (processing block 622). If not, processing logic returns to processing block 618.

If processing logic determines at processing block 602 that the URL from the incoming email message does not include any sub-domains, it further determines whether this URL include a redirection to a target URL (processing block 604). If so, processing logic extracts, from the URL, a URL string for the target URL (processing block 606) and determines whether the extracted URL string matches any spam URL string from URL rules stored in the database (processing block 610). If this determination is positive, processing logic reports a match (processing block 622). If this determination is negative, process 600 ends.

If processing logic determines at processing block 604 that the URL from the incoming email message does not include a redirect to a target URL, it further determines whether the string of this URL matches any spam URL strings from URL rules stored in the database (processing block 612). If so, processing logic reports a match (processing block 622). If not, process 600 ends.

Figure 7:
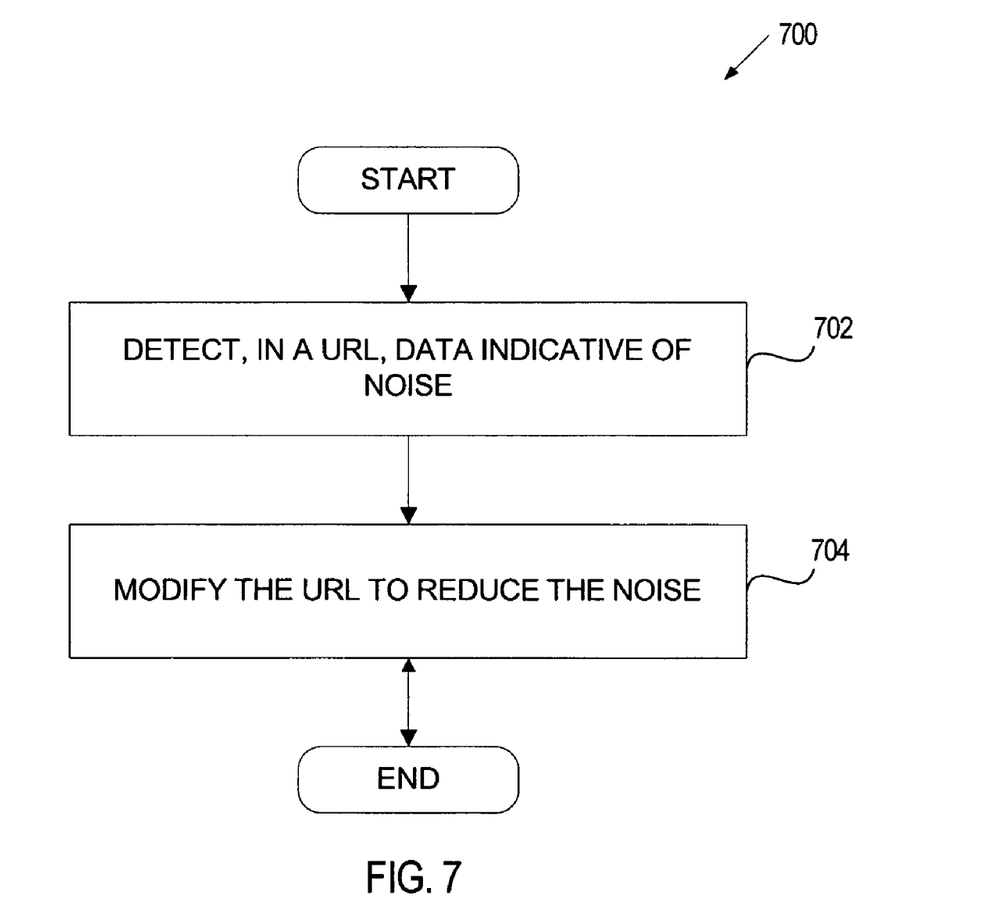
FIG. 7 is a flow diagram of one embodiment of a process for reducing noise in URL data.

FIG. 7 is a flow diagram of one embodiment of a process 700 for reducing noise in URL data. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a server 104 of FIG. 1.

Process 700 begins with processing logic detecting, in URL data, data indicative of noise (processing block 702). Noise may represent extraneous information or encoded information that may be added to the URL to provide legitimacy to the URL. The extraneous information may include, for example, a user name or password or "@" signs. The encoded information may include, for example, numeric character references and character entity references. Numeric character references specify the code position of a character in the document character set. Character entity references use symbolic names so that authors need not remember code positions. For example, the character entity reference "å" refers to the lowercase "a" character topped with a ring.

At processing block 704, processing logic modifies the URL to reduce the noise in the URL data. In one embodiment, the content modification includes translating the numeric character references and character entity references to their ASCII equivalents. For example, translation of hexadecimal encoded ASCII HTML anchor characters in the URL "http://%77%77%77.brightmail.com" will convert this URL into "http://www.brightmail.com". Translation of hexadecimal encoded ASCII HTML enchor numerals in the URL "http://%32%30%39.157.160.5" will convert this URL into "http://209.157.160.5". Translation of decimal encoded ASCII HTML characters in the URL "http://www.brigtmail.com" will convert this URL into "http://www.brightmail.com". Translation of decimal encoded ASCII HTML numerals in the URL "http://209.157.160.5" will convert this URL into "http://209.157.160.5".

In addition, IP addresses encoded as hexadecimal or decimal representations may be translated as well. For example, translation of hexadecimal IP representation in the URL "http://0xd19da005" will convert this URL into "http://209.157.160.5".

Sometimes the conversion may need to be repeated. For example, the string "&" corresponds to the string "&" in ASCII, the string "#" corresponds to the string "#" in ASCII, the string "3" corresponds to 3 in ASCII, the string "8" corresponds to 8 in ASCII, and ";" corresponds to the string ";" in ASCII. Hence, the combined string "&#38;", when converted, results in the string "&" that also needs to be converted.

In one embodiment, the content modification also includes removing extraneous information. For example, a URL having a user name or password may be modified to remove the user name or password. A URL having one or more "@" signs may be modified to exclude the extraneous information prior to the last @ sign. Additionally, "www." may be removed from a URL.

Figure 8:
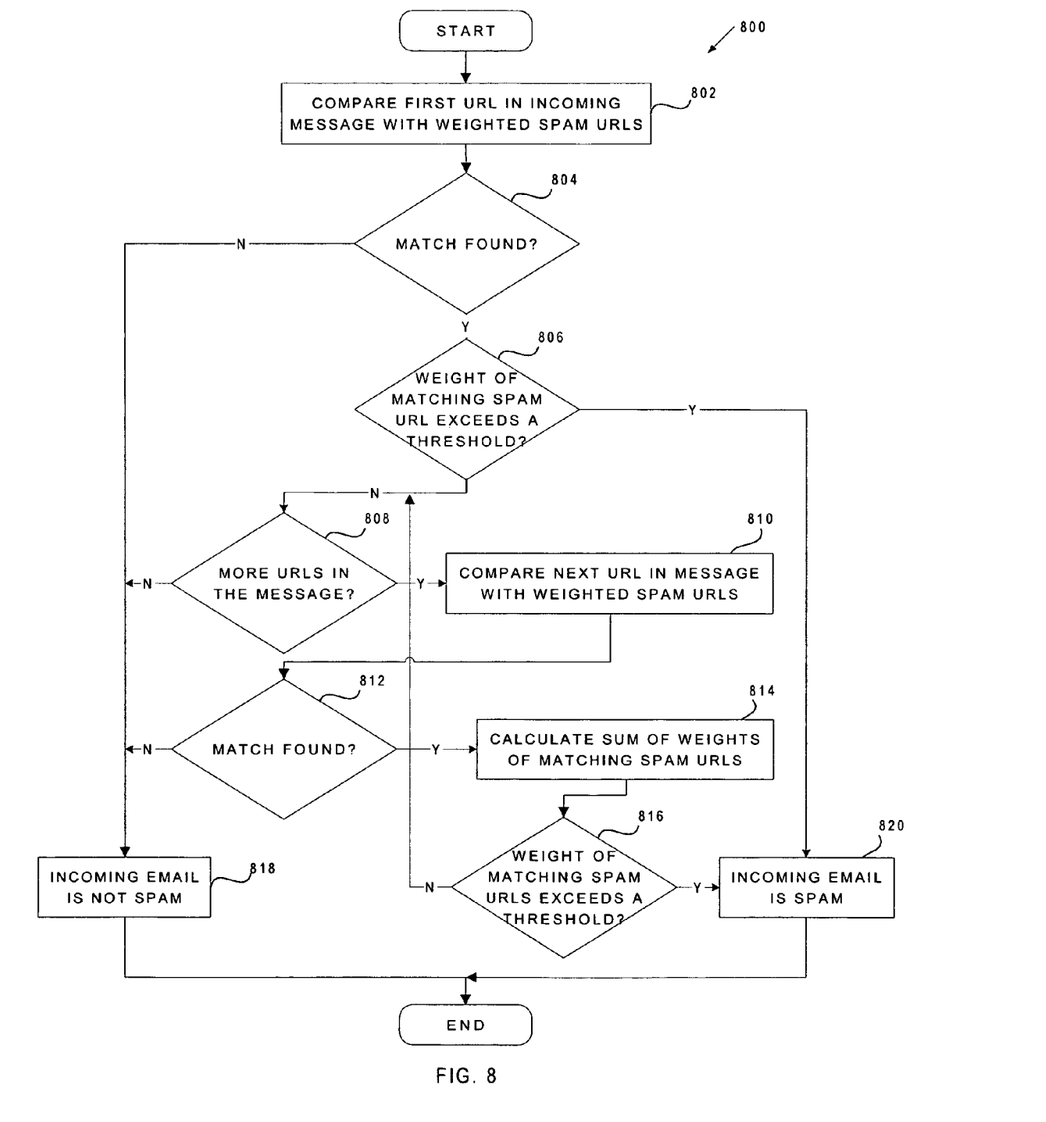
FIG. 8 is a flow diagram of one embodiment of a process for determining whether an incoming email message is spam.

FIG. 8 is a flow diagram of one embodiment of a process 800 for determining whether an incoming email message is spam. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a server 104 of FIG. 1.

Referring to FIG. 8, process 800 begins with processing logic comparing a first URL in the incoming message with weighted spam URLs in URL rules stored in the database (processing block 802). Spam URLs may be weighted according to their effectiveness at identifying spam. For example, the weight of a spam URL may be high enough to exceed a pre-determined threshold, determinative of whether the email is spam. Alternatively, a URL characteristic of a legitimate message (i.e., not spam) may have a low or even a negative weighted value. Additionally, a URL may be weighted such that the URL causes the message to be classified as spam if the message includes one or more additional URLs indicative of spam.

At decision box 804, processing logic decides whether there is a match between the first URL and one of the weighted spam URLs.

If there is no match between the first URL and any of the weighted spam URLs, processing logic determines that the incoming email message is not spam (processing block 818), and the process 800 ends. Otherwise, processing logic decides whether the weight of the matching spam URL exceeds a threshold (processing block 806).

If the weight of the matching spam URL exceeds a threshold, processing logic determines that the incoming email message is spam (block 820), and the process 800 ends. If not, processing logic decides whether there are more URLs in the incoming email message (decision box 808).

If there are no more URLs in the message, processing logic determines that the incoming email is not spam (block 818). If there are more URLs in the message, processing block compares the next URL in the incoming message with the weighted spam URLs (processing block 810).

At decision box 812, processing logic decides whether there is a match between the next URL and one of the weighted spam URLs.

If there is no match between the next URL and any of the weighted spam URLs, processing logic determines that the incoming email message is not spam (block 818), and process 800 ends. Otherwise, processing logic calculates the sum of the weights of the first matching spam and next matching spam URLs (processing block 814).

At decision box 816, processing logic decides whether the sum of the weights of the matching spam URLs exceeds a threshold.

If the sum of the weights of the matching spam URLs exceeds a threshold, processing logic determines that the incoming email message is spam (block 820), and process 800 ends. If not, processing logic returns to decision box 808.

In one embodiment, processing logic determines how many times a host component appears in the URLs of the message. If the frequency of the host component's appearance exceeds a threshold (or is between certain numbers or equal to a certain number), processing logic assigns a weight to the host-level URL that is added to the weight calculated for the message.

In one embodiment, in which a URL rule includes a combination of URLs, the weight assigned to the combination of URLs is considered when determining whether the email message is spam.

Figure 9:
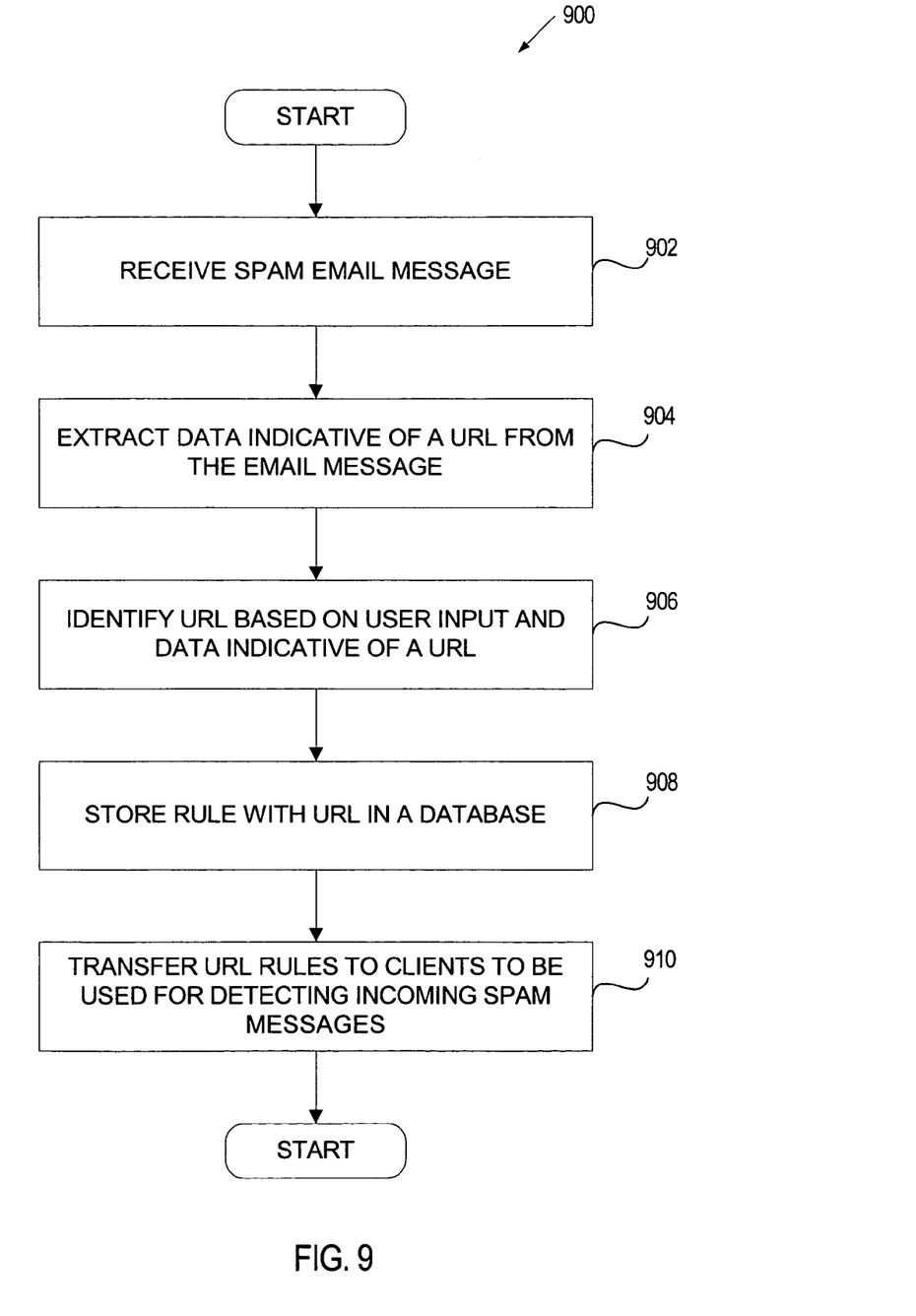
FIG. 9 is a flow diagram of one embodiment of a process for creating a database of URLs indicative of spam.

FIG. 9 is a flow diagram of one embodiment of a process 900 for creating a database of URLs indicative of spam. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a control center 102 of FIG. 1.

Referring to FIG. 9, process 900 begins with processing logic receiving a spam email message (processing block 902).

At processing block 904, processing logic extracts data indicative of a URL from the spam message.

At processing block 906, processing logic identifies the URL based on user input and the data indicative of a URL. In some embodiments, the data indicative of a URL is normalized to reduce noise, as described above with reference to FIG. 7.

At processing block 908, the processing logic creates a URL rule for the URL and stores the URL rule in a database. A URL rule may include a hash value and/or a string of the URL. In some embodiments, a URL rule may include data for multiple URLs. In addition, in some embodiments, a URL rule may include a weight assigned to the URL(s). Further, in some embodiments, a URL rule may include a host-level URL and a path-level URL, URLs of multiple sub-domain levels, or a target URL identified by a redirect included in the URL.

In some embodiments, the spam URLs may go through a quality control process. In one embodiment, the spam URL may be checked against a list of legitimate URLs to ensure that the URL is indicative of spam.

At processing block 910, processing logic transfers URL rules to clients to be used for detecting incoming spam messages. In one embodiment, the URL rules may be transferred to clients using encrypted distribution. Alternatively, the URL rules may be stored to a computer readable medium, such as, for example, a disk.

Figure 10:
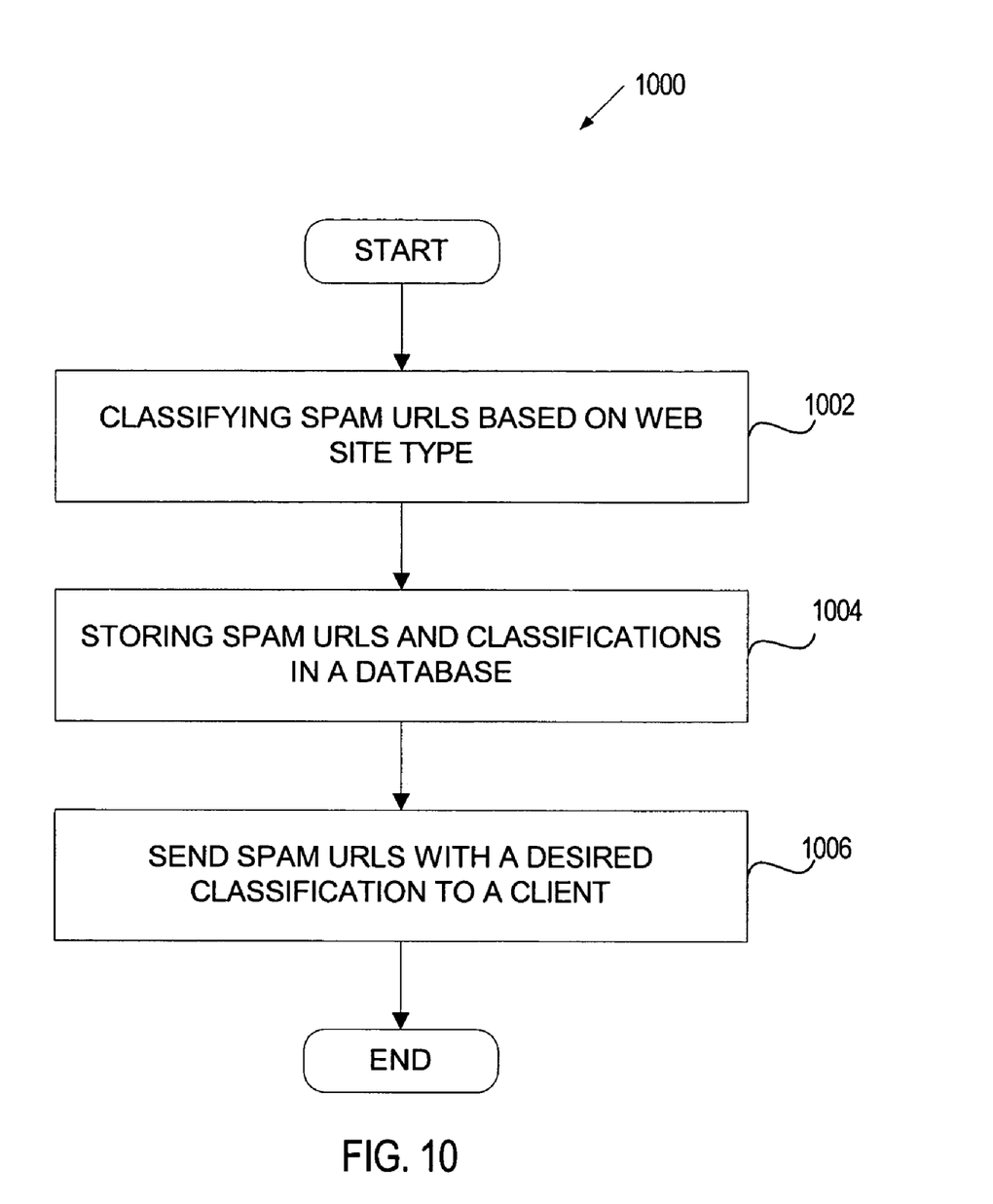
FIG. 10 is a flow diagram of one embodiment of a process for classifying URLs.

FIG. 10 is a flow diagram of one embodiment of a process 1000 for classifying spam URLs. The process may be performed by processing logic that may comprise hardware (e.g., dedicated logic, programmable logic, microcode, etc.), software (such as run on a general purpose computer system or a dedicated machine), or a combination of both. In one embodiment, processing logic resides at a control center 102 of FIG. 1.

Referring to FIG. 10, process 1000 begins with processing logic classifying spam URLs based on types of associated web sites (processing block 1002). Exemplary web site types include adult, product, and the like, wherein adult and product refer to the content of the website to which the URL points.

At processing block 1004, processing logic includes spam URLs and their classifications into URL rules and stores the URL rules in a database.

At processing block 1006, processing logic sends URL rules to a client based on the classification desired by the client. Classifying spam URLs based on the web site type may also enable more effective filtering of URLs by allowing different actions to be taken on different classifications of spam. For example, all adult URLs may automatically be characterized as spam and deleted, while all product URLs may be flagged for further analysis.

An Exemplary Computer System

Figure 11:
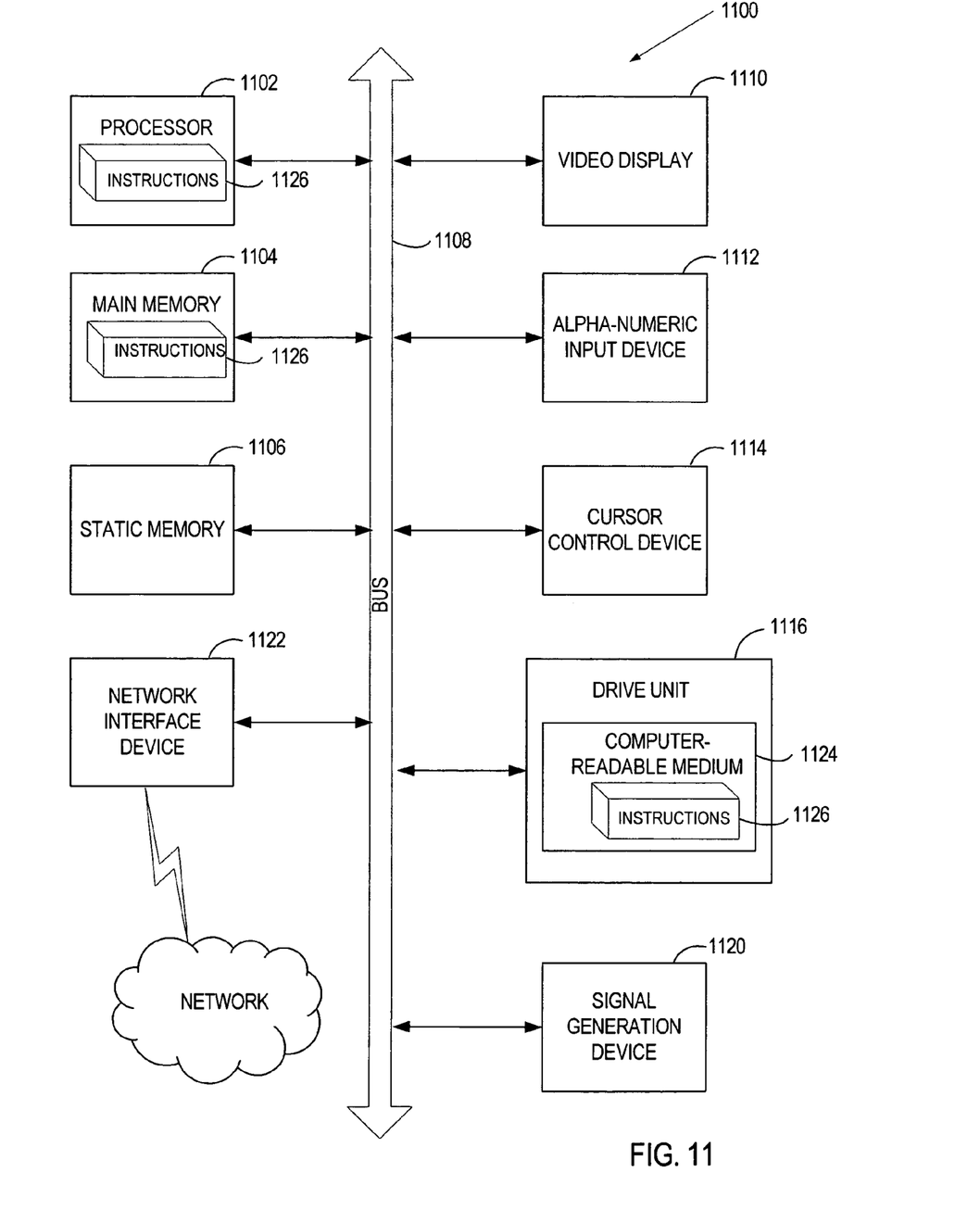
FIG. 11 is a block diagram of an exemplary computer system.

FIG. 11 is a block diagram of an exemplary computer system 1100 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1100 includes a processor 1102, a main memory 1104 and a static memory 1106, which communicate with each other via a buss 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a cursor control device 1114 (e.g., a mouse), a disk drive unit 1116, a signal generation device 1120 (e.g., a speaker) and a network interface device 1122.

The disk drive unit 1116 includes a computer-readable medium 1124 on which is stored a set of instructions (i.e., software) 1126 embodying any one, or all, of the methodologies described above. The software 1126 is shown to reside, completely or at least partially, within the main memory 1104 and/or within the processor 1102. The software 1126 may further be transmitted or received via the network interface device 1122. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

Although the present invention has been described in terms of certain preferred embodiments, those skilled in the art will recognize that other and further changes and modifications may be made hereto without departing from the spirit of the invention, and it is intended to claim all such changes and modifications as fall within the true scope of the invention. Accordingly, the scope of the present invention is not to be limited by the particular embodiments described, but is to be defined only by reference to the appended claims and equivalents thereof.

What is claimed is:

1. A method, comprising:
a computer system receiving a message identified as being a spam message;
the computer system extracting, from the received message, a first uniform resource locator (URL), wherein the first URL includes a host component and a path component;
the computer system generating a first hash value based on the host component, but not the path component, of the first URL;
the computer system generating a second hash value based on the host component and the path component of the first URL;
the computer system using the generated first hash value to create a first spam filter, wherein the first spam filter is usable to determine whether a subsequently received message includes the host component of the first URL; and
the computer system using the generated second hash value to create a second spam filter, wherein the second spam filter is usable to determine whether the subsequently received message includes the host component and the path component of the first URL.

2. The method of claim 1, further comprising before creating the spam filter, the computer system reducing noise in the first URL.

3. The method of claim 2, wherein said reducing includes normalizing decimal or hexadecimal information in the received message.

4. The method of claim 1, wherein the received message is addressed to a probe email address.

5. The method of claim 1, further comprising the computer system distributing the first and second spam filters to one or more other computer systems.

6. The method of claim 1, wherein the first and second spam filters are each assigned a weight value based on that spam filter's effectiveness at identifying spam messages.

7. The method of claim 1, wherein the first spam filter is usable to identify the subsequently received message as being spam based on the subsequently received message including the host component of the first URL and at least a portion of a second URL.

8. The method of claim 1, wherein the first spam filter is usable to identify the subsequently received message as being spam based on the subsequently received message including the host component of the first URL but not including a second URL.

9. The method of claim 1, further comprising the computer system using the created first and second filters to identify subsequently received messages as being spam messages.

10. The method of claim 1, wherein the first URL is associated with a spam category, and wherein the method further comprises the computer system performing different actions based on the spam category.

11. A non-transitory computer-readable medium having program instructions stored thereon that are executable by a computer system to cause the computer system to perform operations comprising:
receiving a message identified as being a spam message;
extracting, from the received message, a first uniform resource locator (URL), wherein the first URL includes a host component and a path component;
generating a first hash value based on the host component, but not the path component, of the first URL;
generating a second hash value based on the host component and the path component of the first URL;
using the generated first hash value to create a first spam filter, wherein the first spam filter is usable to determine whether a subsequently received message includes the host component of the first URL; and
using the generated second hash value to create a second spam filter, wherein the second spam filter is usable to determine whether the subsequently received message includes the host component and the path component of the first URL.

12. The computer-readable medium of claim 11, wherein the first and second spam filters are each assigned a weight value based on that spam filter's effectiveness at identifying spam messages.

13. The computer-readable medium of claim 11, wherein the first spam filter is usable to identify the subsequently received message as being spam based on the subsequently received message including the host component of the first URL and at least a portion of a second URL.

14. The computer-readable medium of claim 11, wherein the first spam filter is usable to identify the subsequently received message as being spam based on the subsequently received message including the host component of the first URL but not including a second URL.

15. The computer-readable medium of claim 11, wherein the operations further comprise distributing the first and second spam filters to one or more other computer systems.

16. The computer-readable medium of claim 11, wherein the operations further comprise using the created first and second filters to identify subsequently received messages as being spam messages.

* * * * *